(12) United States Patent
Singhal

(10) Patent No.: US 8,494,957 B2
(45) Date of Patent: Jul. 23, 2013

(54) METHOD AND APPARATUS FOR RESTAURANT PAYMENT SYSTEM

(76) Inventor: Tara Chand Singhal, Torrance, CA (US)

( * ) Notice: Subject to any disclaimer, the term of this patent is extended or adjusted under 35 U.S.C. 154(b) by 2482 days.

(21) Appl. No.: 10/091,882

(22) Filed: Mar. 6, 2002

(65) Prior Publication Data

US 2002/0095380 A1    Jul. 18, 2002

Related U.S. Application Data

(60) Provisional application No. 60/255,002, filed on Dec. 9, 2000, provisional application No. 60/270,750, filed on Feb. 21, 2001.

(51) Int. Cl.
*G06Q 40/00*    (2006.01)

(52) U.S. Cl.
USPC .......................................................... 705/40

(58) Field of Classification Search
USPC .......................................... 705/36, 36 R, 40
See application file for complete search history.

(56) References Cited

U.S. PATENT DOCUMENTS

| | | | | |
|---|---|---|---|---|
| 4,547,851 A | * | 10/1985 | Kurland | 705/15 |
| 5,128,862 A | * | 7/1992 | Mueller | 705/15 |
| 5,220,501 A | | 6/1993 | Lawlor et al. | |
| 5,235,509 A | * | 8/1993 | Mueller et al. | 705/15 |
| 5,387,784 A | * | 2/1995 | Sarradin | 235/380 |
| 5,933,812 A | * | 8/1999 | Meyer et al. | 705/15 |
| 6,095,410 A | * | 8/2000 | Andersen et al. | 235/380 |
| 6,142,369 A | * | 11/2000 | Jonstromer | 235/380 |
| 6,473,739 B1 | * | 10/2002 | Showghi et al. | 705/26 |
| 6,587,835 B1 | | 7/2003 | Treyez et al. | |
| 6,941,286 B1 | | 9/2005 | Foth | |

FOREIGN PATENT DOCUMENTS

| | | |
|---|---|---|
| DE | 19903363 A | 8/2000 |
| EP | 0910 028 A | 4/1999 |
| EP | 1093097 A | 4/2001 |
| WO | WO 97/45814 A | 12/1997 |

OTHER PUBLICATIONS

News Item, titled "5 Arrested in credit card fraud ring" on p. A5 of Daily Breeze, Jan. 20, 2002, a Torrance, California daily circulation newspaper.

\* cited by examiner

*Primary Examiner* — Lindsay M. Maguire
(74) *Attorney, Agent, or Firm* — Steve Roeda Esq.

(57) ABSTRACT

A payment system for restaurant industry that facilitates efficient payment using a bankcard for a meal in a restaurant and also without providing personal sensitive data from bankcards to employees/waiters of the restaurant. The payment system includes a central system, a portable wireless device, a card processor and a merchant system and a bill with a service code that identifies the merchant, the table and the server.

15 Claims, 4 Drawing Sheets

METHOD AND APPARATUS FOR RESTAURANT PAYMENT SYSTEM

CROSS REFERENCE TO RELATED APPLICATIONS

This application is related to and claims priority on Provisional Application Ser. No. 60/255,002, entitled "Method and Apparatus for an Integrated Identity Security and Payment System," filed on Dec. 9, 2000, by Tara Chand Singhal.

This application is also related to and claims priority on Provisional Application Ser. No. 60/270,750, filed Feb. 21, 2001, entitled "Method and Apparatus for an Integrated Identity Security and Payment System," by Tara Chand Singhal.

This application is also related to and claims priority on U.S. Application Ser. No. 10/014,040, filed Dec. 10, 2001, entitled "Method and Apparatus for an Integrated Identity Security and Payment System," by Tara Chand Singhal.

The contents of Application Serial Nos. 60/255,002, 60/270,750 and Ser. No. 10/014,040 are incorporated herein by reference.

FIELD OF THE INVENTION

The present invention is directed to a method and apparatus for a payment system for restaurants that facilitates efficient payment from dining customers and for customers making payment without disclosing sensitive data to waiters.

BACKGROUND

Typically, at a restaurant on receiving a bill, a dining customer gives his/her credit card to the waiter for payment. The waiter takes the card away from the customer sight to a cash register with a built in card payment processing capability to process the payment with a card processor.

FIG. 1 shows a prior art method of handling and processing payments from a restaurant patron 06 at a dining table with a merchant 08 with a payment processing terminal 04. A partition 20 divides the dining tables from the place where the card payment is processed. A waiter makes many trips to process a payment from a patron 06. As illustrated, in trip 1, waiter presents a bill to a customer. In trip 2, after the customer gives a credit card, the waiter takes it away to the payment terminal 04 and processes the payment transaction with a card processor 36. In trip 3, the waiter brings the payment slip for signature to the customer, as well as for the customer to add a tip on the payment slip. In trip 4, after the customer adds a tip and signs the payment slip, the waiter takes the signed slip and reruns the final payment transaction to include the tip.

In this prior art, the customer hands over a bankcard that has personal sensitive information to an employee of the restaurant in the course of the payment of the restaurant bill. The employee turnover in this industry is very high. The waiter employee of the restaurant may be a dishonest person that misuses the customer personal information. In addition, a waiter makes four trips, as described above, to process a payment, making processing a payment a labor-intensive activity.

A news item from Daily Breeze, Jan. 20, 2002; page A5 shows that a credit card fraud ring uses restaurant workers.

In light of the above, it is an objective of the present invention to provide an apparatus and method that facilitates payment for a meal in a restaurant without providing sensitive information from the bankcards to employee-waiter.

Another objective is to make more efficient processing of bankcard payments from a customer to the restaurant merchant.

SUMMARY

The present invention is directed to an efficient payment system for restaurant industry that facilitates (i) payment by a customer using bankcard for a meal in a restaurant and (ii) payment without the customer providing personal sensitive data from bankcards to employees/waiters of the restaurant.

The payment system includes a central system and a portable wireless device, a card processor, and a merchant payment terminal system. The following steps may be used to effect an efficient and secure payment to the restaurant.

The bill being presented by a waiter carries a service code, identifying a merchant number, a table number and a server number. On receiving the bill, the customer using the wireless device connects to a secure web connection with the central system and is presented a data card to enter data. The customer enters the service code, payment amount and the customer number. The central system with the pre-stored data of the merchant and the customer and using the card processor processes the payment. After the approval of the payment transaction is received from the card processor, the central system presents to the customer, on the wireless device, a data card showing that the payment has been processed. The central system concurrently also sends to the merchant payment terminal system a data record showing the payment amount, the table number and the server number from where the payment has been processed successfully.

The central system 10 stores and/or can readily access merchant data including merchant id and personal data of a customer including information regarding one or more bank accounts of the customer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Introduction

The present invention is directed to a payment system for restaurant industry that facilitates efficient payment using a bankcard for a meal in a restaurant and also without providing personal sensitive data from bankcards to employees/waiters of the restaurant.

Figure 1:
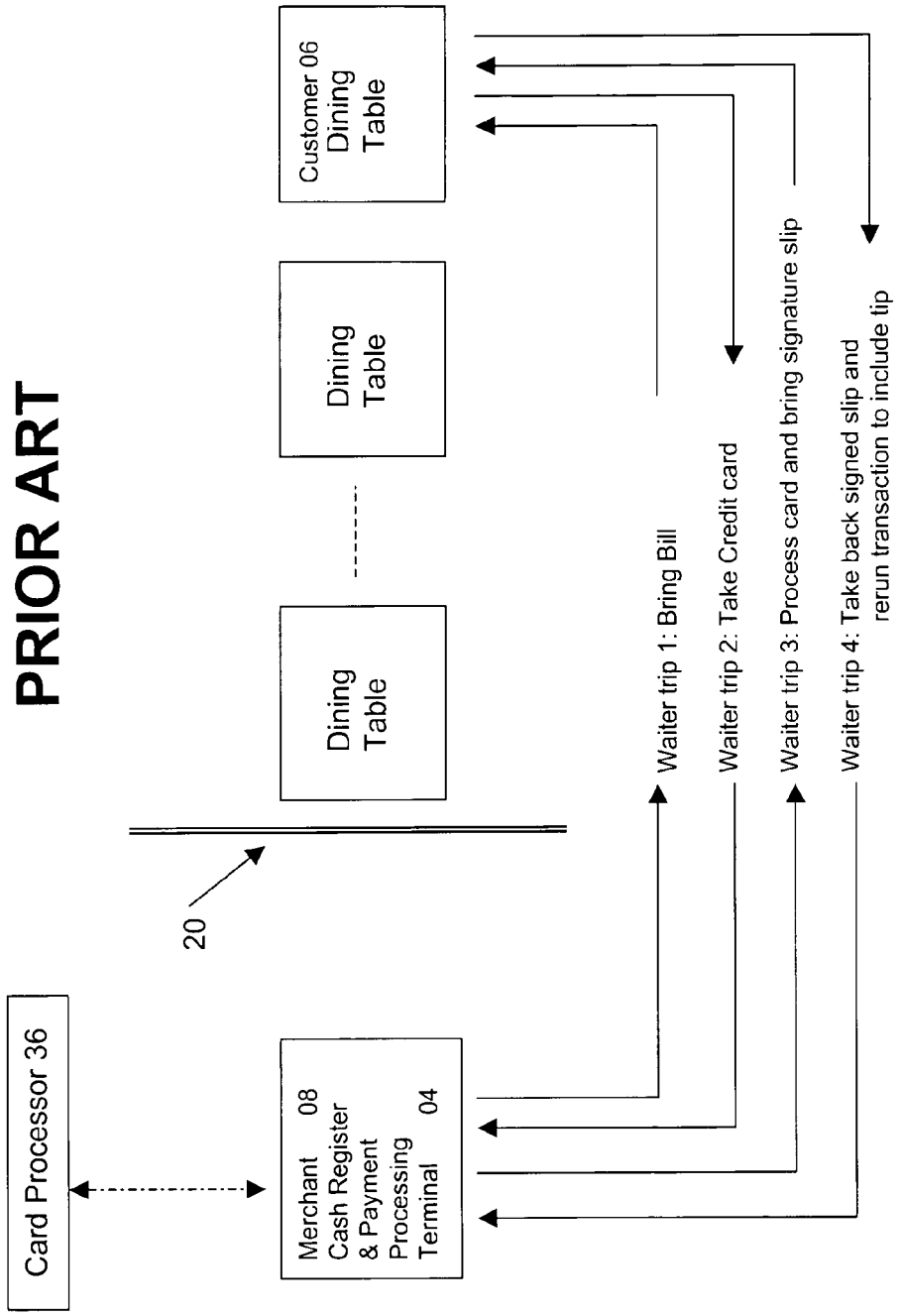
FIG. 1 is a block diagram that illustrates a prior art restaurant payment system.
Figure 2:
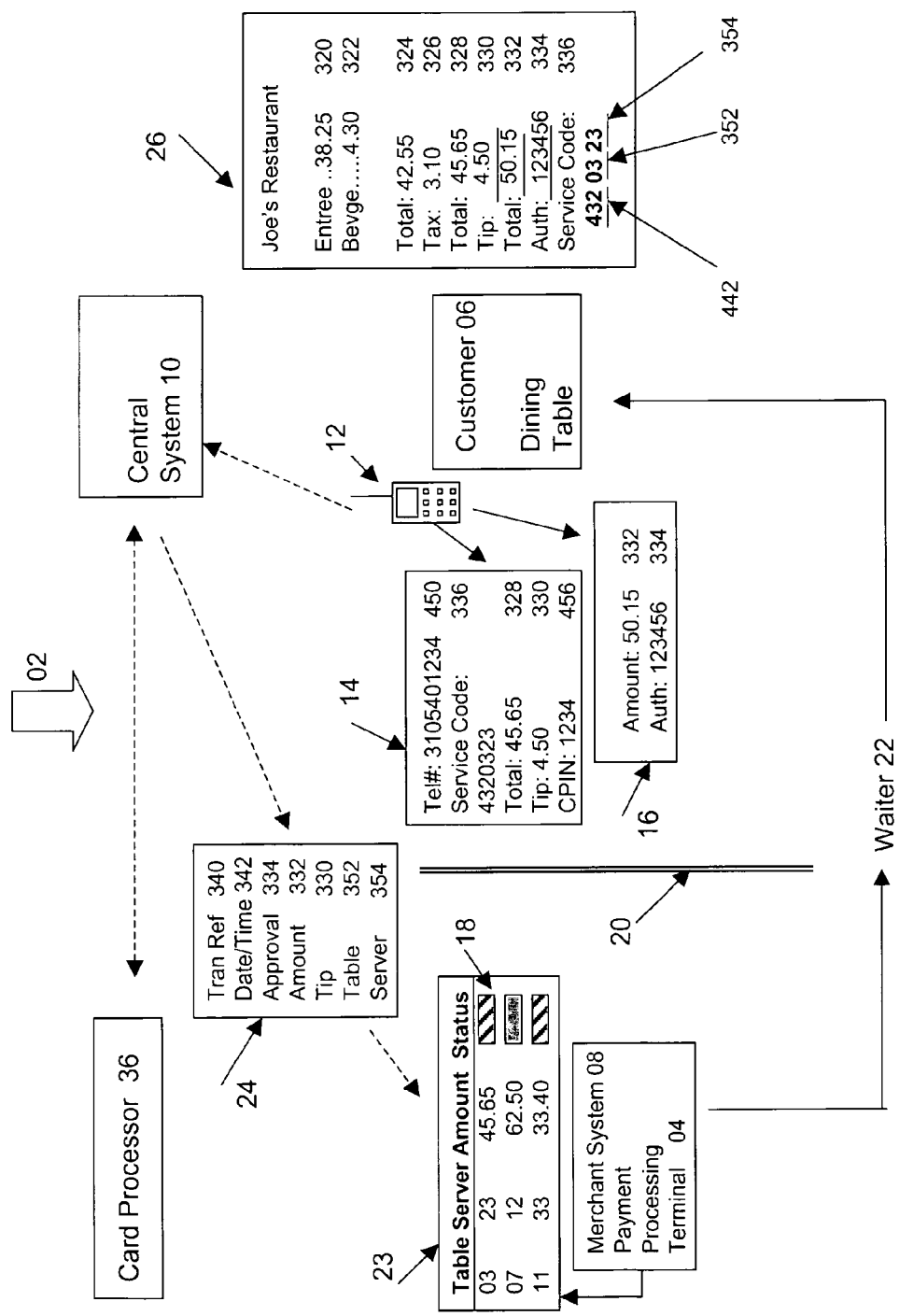
FIG. 2 is a block diagram that illustrates features of the present invention payment system between a dining customer and a restaurant owner.

With initial reference to FIG. 2, the payment system 02 includes a central system 10 and a portable wireless device 12 and a card processor 36. A partition 20 may divide the dining tables with a customer 06 from the merchant computer system 08 with a payment terminal 04. A waiter 22 makes a trip to bring a bill 26 to the customer 06.

The bill 26, in addition to the normal items, as illustrated in FIG. 2, carries a service code 336. The service code 336 may be made up of three parts, the merchant number 442, the table number 352 and the server number 354.

The central system 10 stores and/or can readily access merchant data including merchant ID and personal data of a customer including information regarding one or more bank accounts of the customer.

On receiving the bill 26, the customer 06 using device 12 connects to a secure web connection with the system 10 and is presented a data card 14. The customer enters the data as identified and as described later. The central system 10 with the pre-stored data of the merchant and customer and using the card processor 36 process the payment. After the approval of the payment transaction is received from the card processor 36, the central system 10 presents to the customer, on the wireless device 12, a data card 16, showing that the payment has been processed. The central system 10 concurrently sends to the merchant system 08 a data record 24 showing the payment has been processed successfully. Optionally, the merchant system 08 is attached to a display terminal 23 that displays the table number, server number, amount and the status of the payment by a color coded display icon 18, where the waiter 22 may verify the payment has been made.

These and other aspects of the invention are described herein, where the headings are provided for the convenience of the reader.

Wireless Device 12

The portable wireless device 12 may be a cellular telephone with a screen and a keypad. Alternatively, it may be personal digital assistant (PDA) with a wireless modem, which also has a display screen and a soft keypad.

Central System 10

Figure 3:
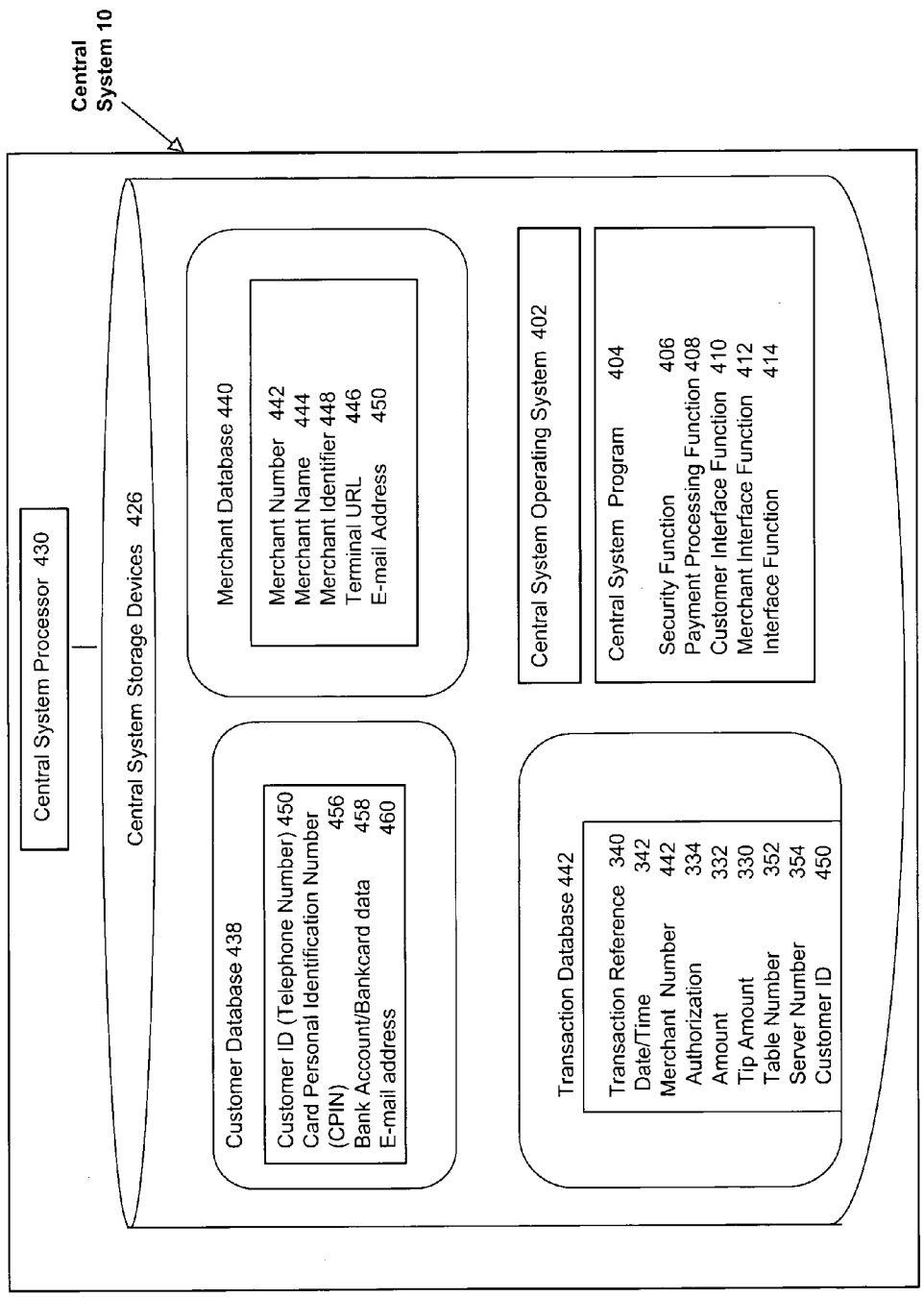
FIG. 3 is a block diagram that illustrates a central system having features of the present invention.
Figure 4:
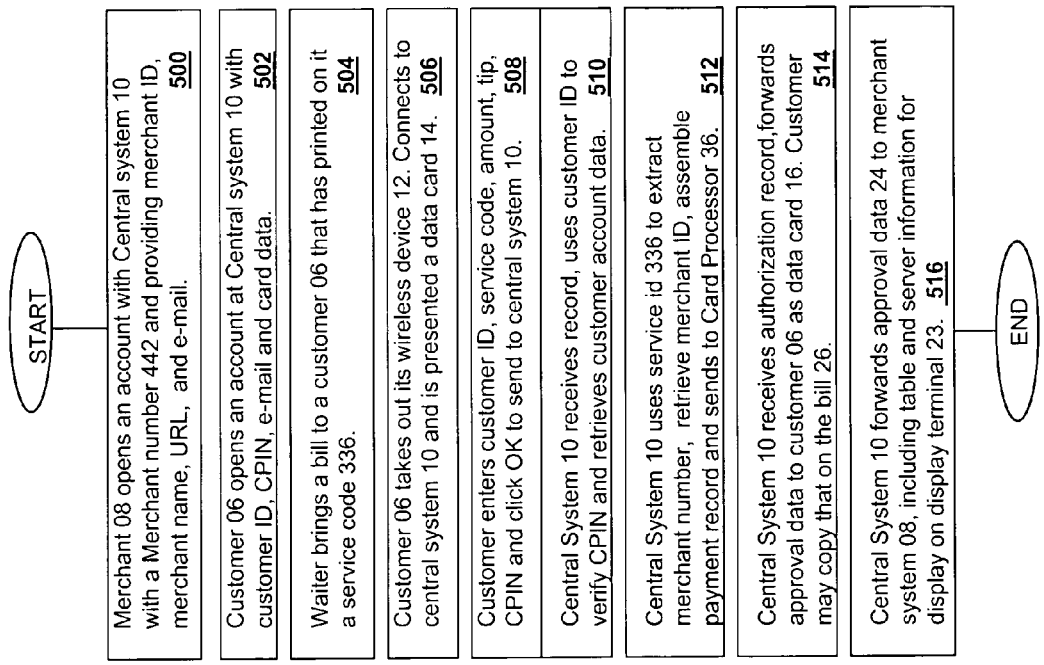
FIG. 4 is illustration of a flow diagram of a payment system having features of the present invention.

Referring to FIG. 3, the central system 10 includes (i) a system storage device 426, (ii) a system operating system 402 stored in the system storage device 426, (iii) a system program 404 stored in the system storage device 426, (iv) and a system processor 430 connected to the system storage device 426.

The system processor 430 can include one or more conventional CPU's. The system processor 430 can be capable of high volume processing and database searches.

The system storage device 426 can, for example, include one or more magnetic disk drives, magnetic tape drives, optical storage units, CD-ROM drives and/or flash memory. The system storage device 426 also contains a plurality of databases used in the processing of transactions pursuant to the present invention. For example, as illustrated in FIG. 3, the system storage device 426 can include a merchant database 440, a customer database 438 and a transaction database 442.

The system 10 includes a system network interface (not shown) that allows the system 10 to communicate with the customer 06 and the merchant 08 and the card processor 36. Conventional internal or external modems may serve as the system network interface. In one embodiment, the system network interface is connected to the customer, merchant and the card processor on a global network.

A merchant network interface (not shown) allows the merchant 08 to communicate with the system 10. Conventional internal or external modems may serve as the merchant network interface. In one embodiment, the merchant network interface is connected to the system 10 on the global network.

A customer network interface (not shown) allows the customer to communicate with the system 10. Conventional internal or external modems may serve as the customer network interface. In one embodiment, the customer network interface is connected to the system 10 on the global network.

The system 10 interfaces with a card processor 36 representing a bankcard authorization network. The bankcard authorization network is a computer system that process payments from bankcards using an automated clearing house to process payments between banks.

The system processor 430 is operative with the system program 404 to perform the Security Function 406, Payment Processing Function 408, Customer Interface function 410, Merchant Interface function 412, and Interface function 414.

Customer Database 438

With reference to FIG. 3, the customer database 438 within the central system 10 contains private data specifically related to the customer 06 that is transferred to the system 10 from the customer.

This database contains the customer identifier 450, CPIN 456, Bank account data 458 and e-mail address 460. The telephone number of the wireless device may serve as the customer identifier. Multiple CPIN and bank account data for each customer may be maintained allowing a customer to use any one of his/her accounts whether they are checking accounts, debit card accounts or credit card accounts. Card personal identification number (CPIN) may be used to identify one of many cards that the customer wishes to use for a payment.

Merchant Database 440

This database maintains data on the merchants who use the payment system 02. The database 440 maintains data on each of the merchant as merchant number 442, merchant name 444, a URL 446, a merchant identification 448, and e-mail address 450.

Merchant ID 448 is an existing ID of the merchant that is used to process his existing card transactions. URL 446 is the uniform resource locater on the global network of his computer system 08, where he can receive the payment record 24 from the central system 10. Alternatively, E-mail 450 is where he can receive record 24 from the central system 10 of payment transactions.

Transaction Database 442

This database logs all payment transactions by a transaction reference 340, date/time of transaction 342, merchant number 442, amount 332, authorization code 334 received from the card processor 36, tip amount 330, table number 352, server number 354, and customer identification 450.

Merchant System 08

With reference to FIG. 2, the merchant system 08 is a prior art computer system. It may be used by the merchant in conjunction with a card processing terminal 04 that is connected to the card processor 36 to process card payments.

According to the present invention, the merchant system 08 may optionally be connected to a display terminal 23 that displays the status of payment transactions. The status of the payments may be displayed by the table number, the server number, the amount to be paid or paid and the status of the payment in a color-coded format 18. This enables the waiter 22 to readily determine that the payment has been successfully processed.

Optionally, the waiter 22 on preparing the bill 26 may use the computer system 08. When the bill 26 is prepared, the display terminal 23 may show the table number, server number, amount and status as payment in process. When the record 24 is received by the merchant system 08 from the central system 10, the status may be updated as Paid and the amount may be updated to what was paid including the tip amount.

Central System Program 404

With reference to FIGS. 2 and 3, the central system program 404 is operative with the central system processor 430 to provide the functions of (i) Security Function 406, (ii) Payment Processing Function 408, (iii) Customer Interface Function 410, (iv) Merchant Interface Function 412, (v) and an Interface function 414. Further, the system program 404 is operated with the payment system processor 430 to perform the tasks of the central system 10 provided herein.

The Security Function 406 performs the tasks of determining and verifying from the customer telephone number 450 and CPIN 456 the customer 06 and the specific bank account 458 when the customer initiates a payment transaction using the wireless device 12. The system 10 is a secure server and uses encryption when communicating with the device 12 and the card processor 36.

The payment processing function 408 performs the tasks of creating payment records and notification records that are transmitted to and from the central system 10. For each payment transaction initiated by the customer via device 12, a payment record to the card processor 36 is assembled. The payment record assembles the bankcard data of the customer 458, the merchant ID 448, the amount of the payment 332, and creates a transaction reference number 340. The system 10 computes the payment amount 332 as the summation of the total amount 328 and the tip amount 330.

Details of such a payment record are prior art and are used in processing payment transactions with a prior art card-processing network. The card-processing network approves the payment and responds with an approval record containing the same data as in payment record and additionally containing an authorization or approval code and date and time of the approval.

The central system 10 on receiving the payment approval record from the card processor 36 creates and sends notification records to the customer and the merchant. The notification record 16 is sent to the customer on device 12 and has the data of amount approved 332 and authorization code 334. The customer may copy this information on the bill 26 directly as tip 330, total 332 and authorization code 334.

The notification record 24 is sent to the merchant 08 computer system and/or the merchant terminal 04 and has the data of transaction reference 340, date/time 342, approval Code 334, amount approved 332, The tip amount 330, table number 352 and server number 354.

The customer on receiving the record 16, may copy the information to the bill 26 as illustrated in italics. The customer may keep a copy of the bill 26. In addition, customer may receive an e-mail having details of this payment transaction for his/her electronic records.

The notification record 24 to merchant is similar to what he would have directly received from the card processor 36. The record 24 having come from the central system 10 additionally provides Tip 330, Table 352 and server 354 to enable the payment record to be associated with a specific service transaction by table and server. The record 24 separately identifies a tip amount that has been chosen by the customer enabling accounting for the tips to be allocated to the employees for tax purposes.

The Interface function 414 performs the tasks of (i) sending and receiving transaction records from and to the prior art card processor 36; (ii) receiving the record 14 from the customer and sending record 16 to the customer on wireless device 12; (iii) and sending record 24 to the merchant system 08.

The central system 10 provides a customer interface (not shown) allowing customer 06 to create account and enter account data. The customer Interface function 410 performs the tasks of permitting the customer to open an account and enter data of telephone number 450, a CPIN 456, and bankcard data 458 of name, card number, expiration date and additional data of PIN or password. The interface is web based. Alternatively, it could be voice based. The knowledge to create an interface is prior art.

The central system 10 provides a merchant interface (not shown) allowing merchant to create merchant account and enter data. The merchant Interface function 412 performs the tasks of permitting the merchant to open an account and enter data of merchant identification 448, merchant name 444, e-mail 450 and URL 446 of the computer system on the global network. The interface is web based. Alternatively, it could be voice based. The knowledge to create an interface is prior art.

Operation

The operation of the apparatus 02 for a payment transaction between a customer and a restaurant merchant can be further understood with reference to the flow chart illustrated in FIG. 5. Importantly, the order of some or all of the steps can be varied. Further, not all of the steps outlined below may be necessary to perform a payment transaction pursuant to the present invention.

At step 500 merchant 08 opens an account with central system 10 with a Merchant number 442 and providing merchant identifier 448, URL 446, e-mail 450.

At step 502, customer 06 opens an account at central system 10 with customer ID in form of telephone number 450, CPIN 456, e-mail 460 and bankcard data 458.

At step 504, waiter 22 brings a bill 26 to a customer 06 with a service code 336. At step 506 customer 06 takes out his/her wireless device 12 and connects to central system 10 website and is presented a data card 14. At step 508, customer 06 enters data of customer ID 450, service code 336, amount 330, tip 332 and CPIN 456 and OK to send to central system 10. At step 510 central system 10 receives record 14, uses customer id 450 to verify CPIN 456 and retrieves customer account data 458. At step 512, central system 10 uses service code 336 to find merchant number 452, retrieve merchant ID 448, assemble payment record and sends to card processor 36. At step 514, central system 10 receives authorization record from card processor 36, forwards approval data to customer as data card 16. At step 516, central system 10 forwards approval data record 24 to merchant system 08 for display on display terminal 23 that includes table and server information and payment status 18.

In summary, the payment system 02 allows the merchant 08 to more efficiently process payments from dining customers and allows customer 06 to make payments without using and disclosing their card to employees of the merchant. Thus the payment system 02 provides efficient, private and secure payment transactions.

While the particular apparatus 02 as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A payment system for restaurant merchants that provides privacy of customer bankcard data of a customer from a merchant system, comprising:
   a. a restaurant bill that shows a payment amount and a service code, the service code includes a merchant number identification to a central computer system that is independent from the merchant system;

b. a wireless device of the customer, (i) is entered a data of the service code, a payment amount, and an optional tip into the device, and (ii) the device wirelessly sends the data to the central computer system which pre-stores customer data and merchant data;

c. the central computer system has a processor (i) that identifies the customer (ii) processes a payment request from the customer to the merchant by retrieving customer and merchant data and submits a payment transaction request to an existing payment authorization network (iii) receives a payment approval record from the payment authorization network (iv) wirelessly sends a payment approval notification to the customer on the wireless device and (iv) sends the payment approval notification to the merchant system, wherein the central computer system in lieu of the merchant system having submitted the payment transaction request, the payment system maintains privacy of customer bankcard data from the merchant system.

2. The system as in claim 1, further comprising:
the central computer system stores (i) customer identification data that can identify a customer, (ii) a plurality of customer bank account data and (iii) wireless device notification data that can notify a customer on the wireless device.

3. The system as in claim 2, further comprising:
the customer identification data includes use of a personal number that is a combination of wireless device telephone number and a personal identification number that is entered into the wireless device.

4. The system as in claim 1, further comprising:
the central computer system stores merchant identification data that identifies the merchant to a payment authorization network and merchant computer system notification data that notifies a merchant using the merchant computer system.

5. The system as in claim 1, where the service code, further comprising:
the service code includes in addition to the merchant number identification, a table number and a server number.

6. The system as in claim 5, further comprising:
the payment approval notification to the merchant system includes the table number and the server number enabling a display terminal interfaced to the merchant system to display payment status data that includes a date, a time, a transaction reference, the table number, the server number, the payment amount, tip and a payment status.

7. A method of payment to restaurant merchants that provides privacy of customer bankcard data of a customer from a merchant system, comprising the steps of:
a. enabling presenting a restaurant bill that shows a payment amount and a service code, the service code includes a merchant number identification to a central computer system that is independent from the merchant system;

b. enabling entering into a wireless device of the customer, (i) the service code, a payment amount and an optional tip into the device, and (ii) wirelessly sending the data to the central computer system which pre-stores customer data and merchant data;

c. enabling identifying the customer and processing a payment transaction from the customer to the merchant by the central computer system by retrieving customer and merchant data and submitting a payment transaction request to an existing payment authorization network;

d. enabling receiving a payment approval record by the central computer system and wirelessly sending payment approval notification to the customer on the wireless device;

e. enabling sending payment approval notification to the merchant system, by the central computer system, wherein the central computer system in lieu of the merchant system having submitted the payment transaction request the payment system maintains privacy of customer data from the merchant system.

8. The method as in claim 7, further comprising the steps of:
enabling storing by the central computer system (i) customer identification data that can identify the customer, (ii) a plurality of customer bank account data, and (iii) wireless device notification data that can notify the customer.

9. The method as in claim 8, further comprising the steps of:
enabling using a personal number that is a combination of wireless device telephone number and a personal identification number as the customer identification data that can identify the customer in the central computer system and that is entered into the wireless device.

10. The method as the central computer system in claim 7, further comprising the steps of:
enabling storing in the central computer system, the merchant identification data that identify the merchant to a payment authorization network and merchant computer system notification data that can notify the merchant by the merchant computer system.

11. The method as in claim 7, where the restaurant bill, further comprising the steps of:
including in the service code in addition to the merchant number identification, a table number and a server number.

12. The method as in claim 11, further comprising the steps of:
enabling receiving the payment approval notification from the central computer system into the merchant system including the table number and the server number, displaying payment status data on a display terminal interfaced to the merchant system, that includes, a date, a time, a transaction reference, the table number, the server number, the amount, tip, and the payment status.

13. A privacy payment system for restaurant merchants, that protects customer bankcard data from a merchant system, comprising:
(a) a customer wireless device that originates a payment request for payment of a bill to a restaurant merchant, the bill has a service code that includes a merchant number identification to a central computer system, that is independent from the merchant system, the wireless device originates the payment request by reading the service code and wirelessly sending to the central computer system;

(b) the central computer system has a processor that processes the payment request with pre-stored customer data and merchant data using an existing payment authorization network and forwards the payment approval notification to the merchant system, wherein the central computer system in lieu of the merchant system processing the payment request, the privacy payment system maintains privacy of customer bankcard data from the merchant system.

14. The privacy payment system as in claim 13, further comprising:
   the payment request bill identifies a payment amount and the service code as printed on the bill, from the merchant system, and presented to the customer at the merchant's premises includes a table number and a server number.

15. The privacy payment system as in claim 13, comprising:
   the central computer system sends the payment approval notification to the customer on the wireless device, contemporaneously to sending the payment approval notification to the merchant system.

* * * * *